United States Patent
Lin et al.

(10) Patent No.: US 9,389,704 B2
(45) Date of Patent: Jul. 12, 2016

(54) INPUT DEVICE AND METHOD OF SWITCHING INPUT MODE THEREOF

(71) Applicant: ASUSTeK COMPUTER INC., Taipei (TW)

(72) Inventors: Sheng-Ta Lin, Taipei (TW); Ping-Yu Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 65 days.

(21) Appl. No.: 14/206,592

(22) Filed: Mar. 12, 2014

(65) Prior Publication Data

US 2014/0267109 A1    Sep. 18, 2014

Related U.S. Application Data

(60) Provisional application No. 61/802,909, filed on Mar. 18, 2013.

(30) Foreign Application Priority Data

Dec. 12, 2013   (TW) .............................. 102145945 A

(51) Int. Cl.
| | |
|---|---|
| *G06F 3/041* | (2006.01) |
| *G06F 3/033* | (2013.01) |
| *G09G 5/08* | (2006.01) |
| *G06F 3/0354* | (2013.01) |
| *G06F 3/0488* | (2013.01) |
| *G06F 3/0346* | (2013.01) |

(52) U.S. Cl.
CPC .......... *G06F 3/03543* (2013.01); *G06F 3/0346* (2013.01); *G06F 3/03547* (2013.01); *G06F 3/04883* (2013.01)

(58) Field of Classification Search
CPC ........... H04N 21/42224; H04N 5/4403; G06F 3/0346; G06F 3/03543; G06F 3/03547; G06F 3/04883
See application file for complete search history.

(56) References Cited

U.S. PATENT DOCUMENTS

| | | | |
|---|---|---|---|
| 2005/0052418 A1* | 3/2005 | Khajavi ............. | G06F 3/03543 345/163 |
| 2005/0078087 A1* | 4/2005 | Gates et al. ................... | 345/163 |
| 2010/0231384 A1* | 9/2010 | Reams ......................... | 340/540 |
| 2013/0128127 A1* | 5/2013 | Xu et al. ....................... | 348/734 |
| 2013/0147833 A1* | 6/2013 | Aubauer et al. .............. | 345/619 |

FOREIGN PATENT DOCUMENTS

| | | |
|---|---|---|
| CN | 102141849 | 8/2011 |
| CN | 202306454 | 7/2012 |

\* cited by examiner

*Primary Examiner* — Nicholas Lee
(74) *Attorney, Agent, or Firm* — Muncy, Geissler, Olds & Lowe, P.C.

(57) ABSTRACT

An input device and a method of switching an input mode of the input device are provided. The input device includes a main body, a state detecting module, a touchpad and a control unit. The main body includes a top surface, a bottom surface and a side surface connected the bottom and top surfaces. The state detecting module includes a first state detecting unit disposed at the bottom surface and a second state detecting unit disposed at the side surface. The first and second state detecting units detect a using state of the input device and generate first and second detecting signals, respectively. The control unit is electrically connected to the state detecting module and the touchpad, and the control unit switches the touchpad to a first control mode or a second control mode according to the first and second detecting signals.

19 Claims, 7 Drawing Sheets

| state detecting unit  mode | second state detecting unit 202a | second state detecting unit 202b | first state detecting unit 201 |
|---|---|---|---|
| first control mode (mouse mode) | ○ | ○ | × |
| second control mode (remote control or touchpad mode) | ○ | ○ | ○ |
| second control mode (touchpad mode) | × | × | ○ |
| second control mode (touchpad mode) | ○ | ○ | ○ |
| first control mode (mouse mode) | × | × | × |
| first control mode (mouse mode) | × | × | × |
| second control mode (touchpad mode) | × | × | ○ |
| second control mode (remote control or touchpad mode) | × | × | × |

FIG. 5

INPUT DEVICE AND METHOD OF SWITCHING INPUT MODE THEREOF

CROSS-REFERENCE TO RELATED APPLICATION

This application claims the priority benefit of U.S. provisional application Ser. No. 61/802,909, filed on Mar. 18, 2013 and TW application serial No. 102145945, filed on Dec. 12, 2013. The entirety of the above-mentioned patent applications are hereby incorporated by reference herein and made a part of specification.

BACKGROUND OF THE INVENTION

1. Field of the Invention

The invention relates to a device used for processing digital data and, more particularly, to an input device and a method of switching an input mode.

2. Description of the Related Art

Conventionally, an input device, such as a keyboard, a mouse or a touchpad is used for operating a laptop. The conventional touchpad controls a mouse cursor on an image by moving fingers on the touchpad.

However, the function and the operating scenario of the mouse and the touchpad are different, the hand gesture and the operating mode of the mouse and the touchpad are also different. In detail, wrists and elbows are moved in operating the mouse; however, fingers and wrists are moved in operating the touchpad. Although the touchpad is not as accurate as the mouse while inputting, the touchpad can define different input gestures on an image at a corresponding electronic device, such as a zooming gesture to zoom in and zoom out the image.

In addition, a mouse and a touchpad are independent input devices, while the touchpad is usually integrated to the electronic device, and the mouse is usually separated from the electronic device. Therefore, in practice, the mouse and the touchpad have to be switched frequently which is annoying to users.

BRIEF SUMMARY OF THE INVENTION

An input device including a main body, a state detecting module, a touchpad and a control unit is provided.

The main body includes a top surface, a bottom surface and a side surface connected the bottom surface and the top surface. The state detecting module includes a first state detecting unit and a second state detecting unit. The first state detecting unit is disposed at the bottom surface. The second state detecting unit is disposed at the side surface. The first state detecting unit and the second state detecting unit detect a using state of the input device and generate a first detecting signal and a second detecting signal respectively. The touchpad is disposed at the top surface. The control unit is electrically connected to the state detecting module and the touchpad, and the control unit switches the touchpad to a first control mode or a second control mode according to the first detecting signal and the second detecting signal.

A method of switching an input mode of an input device is provided. The input device includes a main body, a state detecting module and a touchpad.

The main body includes a top surface, a bottom surface and a side surface connected the bottom surface and the top surface. The state detecting module includes a first state detecting unit and a second state detecting unit. The first state detecting unit is disposed at the bottom surface, and the second state detecting unit is disposed at the side surface, the touchpad is disposed at the top surface.

The method comprises the following step: detecting a using state of the input device by the first state detecting unit and the second state detecting unit; generating a first detecting signal and a second detecting signal; and switching the touchpad to a first control mode or a second control mode according to the first detecting signal and the second detecting signal.

Thus, user needn't to change the using behavior when using the input device integrated with different input modes, which is a more convenient input device for users.

BRIEF DESCRIPTION OF THE DRAWINGS

These and other features, aspects and advantages of the invention will become better understood with regard to the following embodiments and accompanying drawings.

FIG. 5 is a state table showing the input device in FIG. 1; and

DETAILED DESCRIPTION OF THE EMBODIMENTS

An input device is illustrated with relating drawing, and the same number denotes the same component. Some indirectly related components are not shown for a concise purpose.

Figure 1:
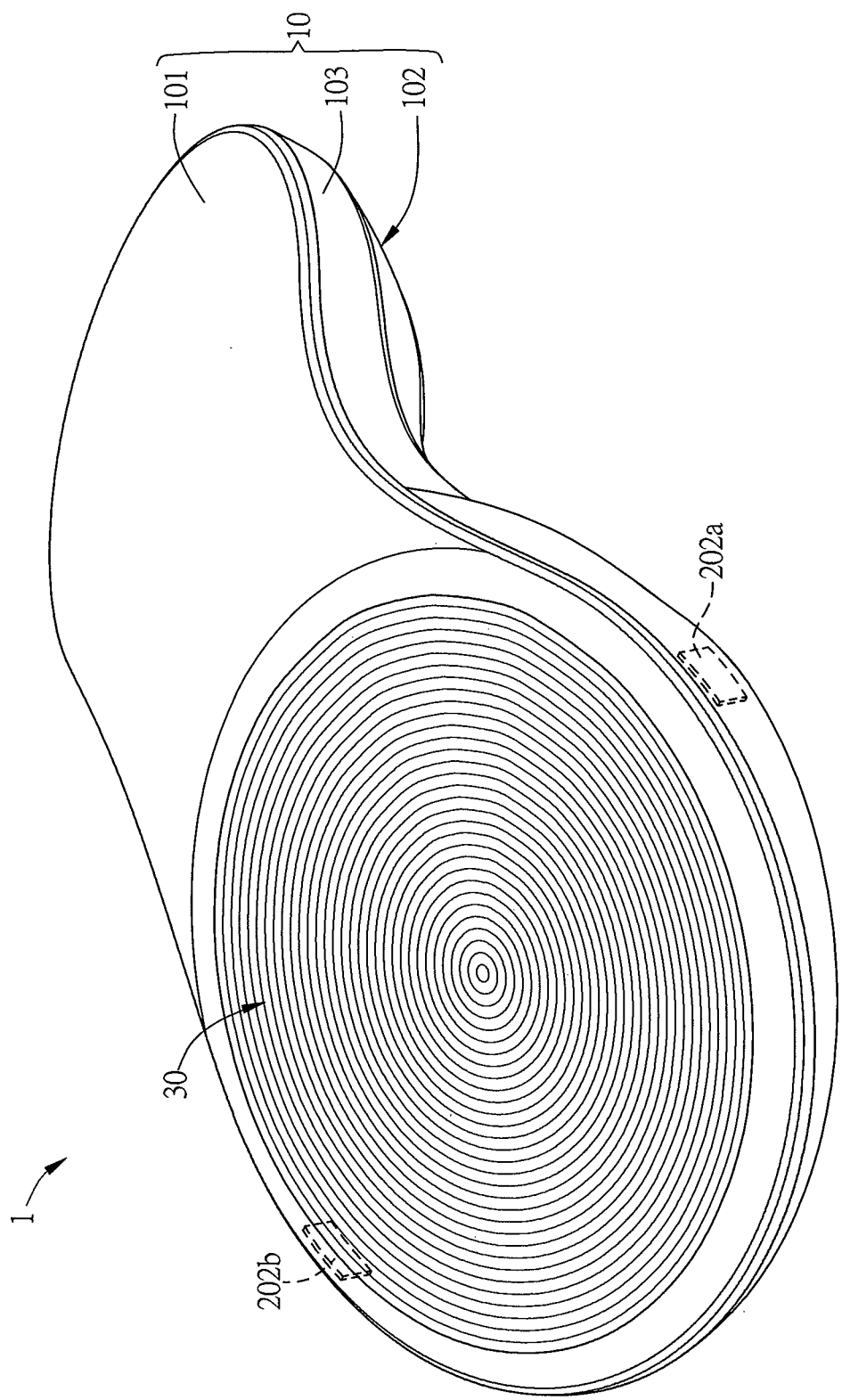
FIG. 1 is a perspective view showing an input device in an embodiment of the invention.
Figure 2A:
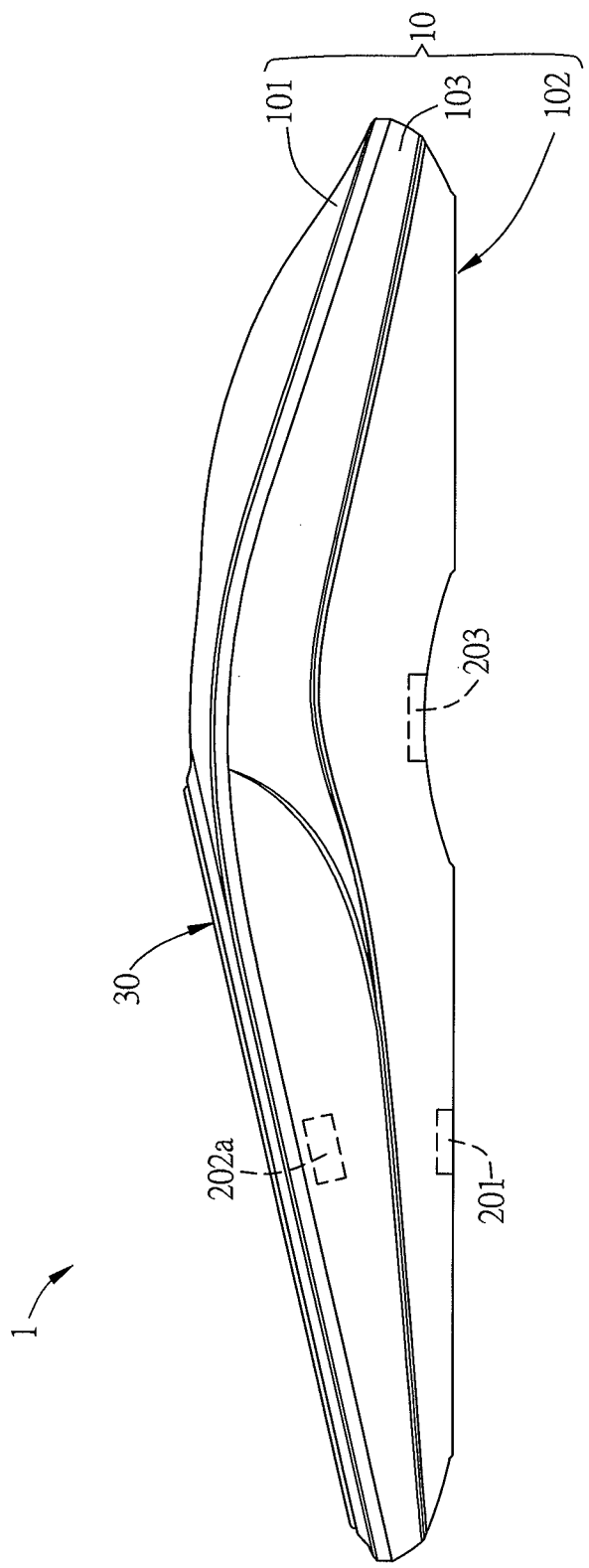
FIG. 2A is a side view showing the input device in FIG. 1.
Figure 2B:
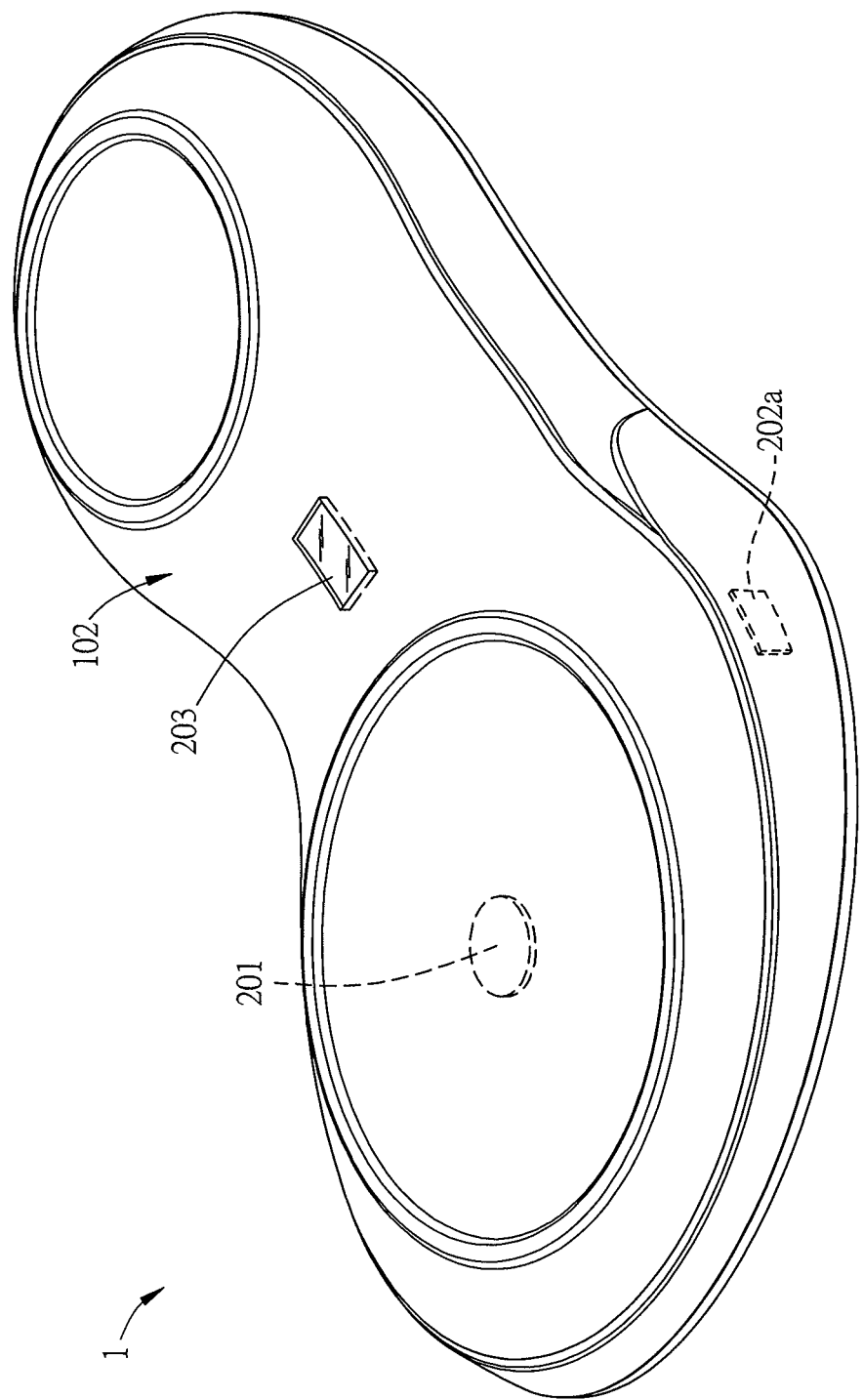
FIG. 2B is a bottom view showing the input device in FIG. 1.
Figure 3:
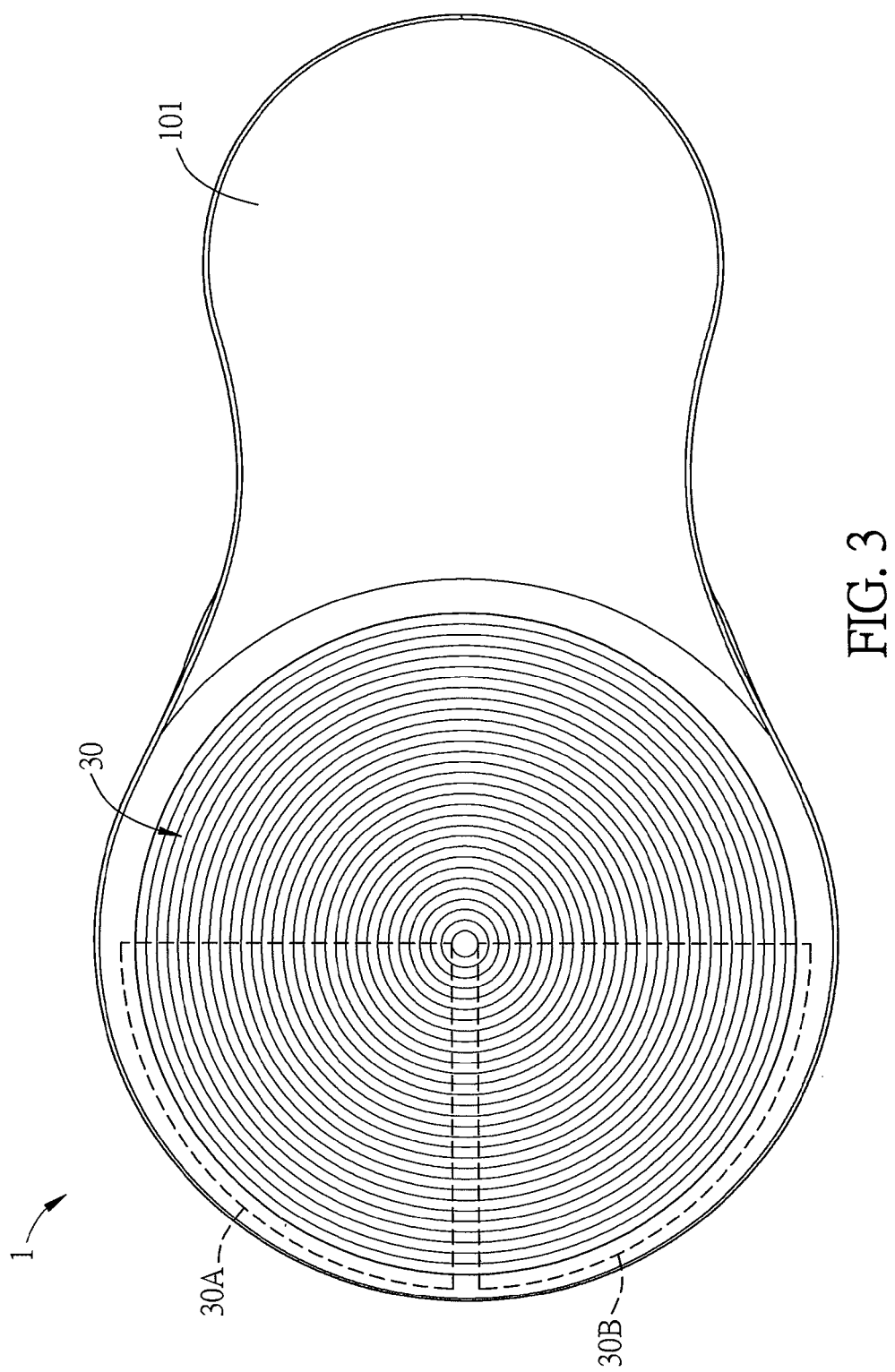
FIG. 3 is a top view showing the input device in FIG. 1.
Figure 4:
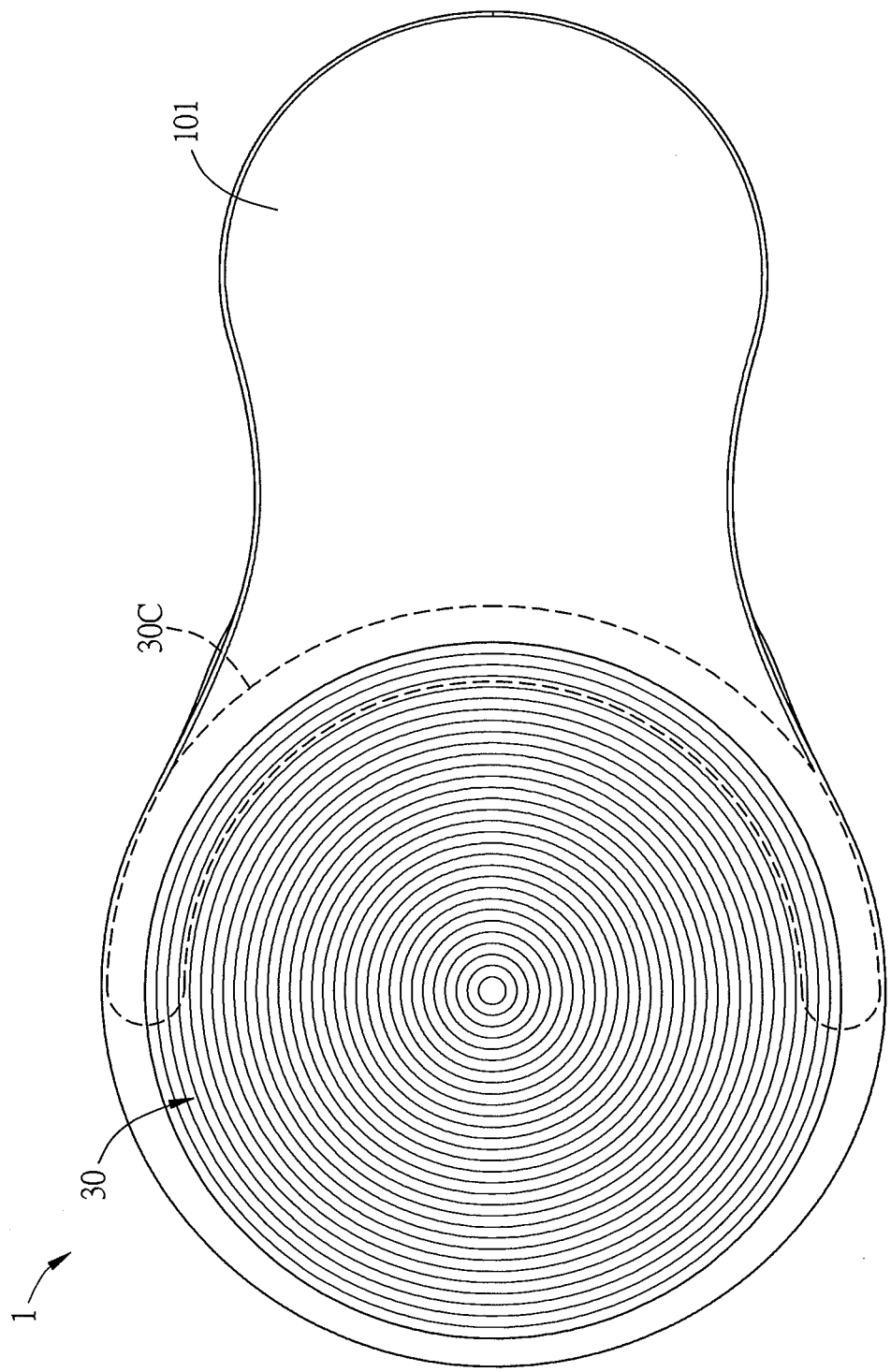
FIG. 4 is another top view showing the input device in FIG. 1.

Please refer to FIG. 1 to FIG. 5, FIG. 1 is a perspective view showing an input device in an embodiment of the invention, FIG. 2A and FIG. 2B are side view and bottom view of the input device in FIG. 1, FIG. 3 and FIG. 4 are top views of the input device in FIG. 1, FIG. 5 is a state table of the input device in FIG. 1.

Please refer to FIG. 1 and FIG. 2, in an embodiment, an input device 1 includes a main body 10, a state detecting module, a touchpad 30 and a control unit (not shown). The control unit is electrically connected to the state detecting module and the touchpad 30.

In the embodiment, the input device 1 can be connected wired or wirelessly, and the touchpad 30 may be a capacitive touchpad, which is not limited herein. Additionally, the signal transmission and the control method of the state detecting unit and the touchpad 30 in the embodiment are known by people skilled in the art, which are omitted herein.

Please refer to FIG. 1, the main body 10 includes a top surface 101, a bottom surface 102, and a side surface 103 connected the bottom surface 102 and the top surface 101. The top surface 101 is opposite to the bottom surface 102. The touchpad 30 is disposed at the top surface 101, and the touchpad 30 covers the top surface 101 partly or completely, which is not limited herein.

In the embodiment, the state detecting module includes a first state detecting unit 201 and a second state detecting unit. The first state detecting unit 201 is disposed at the bottom surface 102, and the second state detecting unit 202a and 202b are disposed at the side surface 103 of the main body 10. The second state detecting units 202a and 202b are taken as an example in the embodiment. The second state detecting units 202a and 202b are disposed at both sides of the input device 1.

The first state detecting unit 201 and the second state detecting units 202a and 202b may be a capacitive sensor, a temperature sensor, an infrared sensor, a proximity sensor and a camera unit, or combinations above, which is not limited herein.

The first state detecting unit 201 and the second state detecting units 202a and 202b detect a using state of the input device 1 and generate a first detecting signal and a second detecting signal respectively. The control unit switches the touchpad 30 to a first control mode or a second control mode according to the first detecting signal and the second detecting signal.

In the embodiment, the first control mode is a mouse mode, and the second control mode is a touchpad mode, a remote control mode or a combination above, which is not limited herein.

In the embodiment, the first state detecting unit 201 is a capacitive sensor as an example. The first detecting signal generated from the first state detecting unit 201 is a capacitance signal, and the capacitance is 0 (shown as "X" in FIG. 5), the second detecting signal generated from the second state detecting units 202a and 202b is a capacitance signal, and the capacitance is 0 (shown as "X" in FIG. 5). In that case, it can be determined that the input device 1 may be disposed at a platform or a desk, and the input device 1 is not grasped at both sides, in this state, the input device 1 is used as a touchpad (switched to the second control mode).

If the first detecting signal generated from the first state detecting unit 201 is a capacitance signal, and the capacitance is 0, the second detecting signal generated from the second state detecting units 202a and 202b is a capacitance signal, and the capacitance is a positive value (shown as "O" in FIG. 5), it can be determined that the input device 1 may be disposed at a platform or a desk, and the input device 1 is grasped, in this state, the input device 1 is used as a mouse. Consequently, the input device 1 is switched to the first control mode (a mouse mode).

Furthermore, the first detecting signal generated from the first state detecting unit 201 is a capacitance signal, and the capacitance is positive (shown as "O" in FIG. 5, which represents that the input device 1 is on a hand), and the second detecting signal generated from the second state detecting units 202a and 202b is a capacitance signal, and the capacitance is positive. In that case, it can be determined that the input device 1 may be grasped by a whole hand for touching, or the input device 1 is used as a remote control device. Then, the input device 1 is switched to the second control mode (a touchpad mode or a remote control mode). Other determining methods and corresponding switching modes can refer to the table in FIG. 5, which is omitted herein.

If the first state detecting unit 201 and the second state detecting units 202a and 202b are temperature sensors, when the first state detecting unit 201 and the second state detecting units 202a and 202b detect that a temperature is below a default temperature (such as a temperature of the human body), it can be determined that the input device 1 is not grasped, and the input device 1 may be disposed at a platform or a desk. In that case, the first detecting signal and the second detecting signal are temperature signals, and the input device 1 is used as a touchpad (switched to the second control mode).

Moreover, the first state detecting unit 201 and the second state detecting units 202a and 202b are camera units as an example, and the camera unit may be a camera. The first state detecting unit 201 and the second state detecting units 202a and 202b take images in different timing sequences, and the images at adjacent timing sequences are compared to determine whether the state of the input device 1 is changed. If the state of the input device 1 is not changed, it can be determined that the input device 1 is disposed at a plane or a desk, and the second state detecting units 202a and 202b do not catch that a hand of a user cover the second state detecting units, and then it can be determined that the input device 1 is taken from the plane or the desk and not grasped by the user, and the input device 1 is used as a touchpad (switched to the second control mode). In the embodiment, the first detecting signal is a command signal inputted after that the images of adjacent timing sequences are compared.

In addition, the detecting area of the second state detecting units 202a and 202b can be adjusted according to requirements. The setting position and the detecting area (the dashed area) are just for demonstration, which is not limited herein.

The sensors of the first state detecting unit 201 and the second state detecting units 202a and 202b are not limited to the same type, which can be adjusted according to the requirements.

The mouse mode is that the input device 1 is moved by the user to control a cursor on a screen of a corresponding electronic device. The touchpad mode is that a corresponding electronic device is controlled by the gestures via the fingers on the touchpad.

Moreover, please refer to FIG. 3, if the touchpad 30 is in the first control mode, the touchpad 30 includes a first instruction input area 30A and a second instruction input area 30B, and the first instruction input area 30A is adjacent to the second instruction input area 30B. The first instruction input area 30A and the second instruction input area 30B can be used as a left button and a right button of a mouse.

If the input device 1 is in the first control mode, it also can support some simple gestures at the touchpad 30. For example, scroll bars of corresponding windows are scrolled by sliding a finger or two fingers on the touchpad 30. Additionally, it also can define other gestures, for example, when three fingers (three detecting points are detected simultaneously) sliding on the touchpad 30 simultaneously is detected, the gesture can correspond to call out a task manager, return back to the home screen, switch images according to the direction of the sliding, respectively.

Please refer to FIG. 4, if the input device 1 is in the second control mode (such as the touchpad mode), the touchpad further includes a third instruction input area 30C, and the third instruction input area 30C is disposed at the periphery of the touchpad 30. Although the third instruction input area 30C is disposed at the lower periphery of the touchpad 30 shown in the FIG. 4, the third instruction input area 30C also can be disposed at the upper or whole periphery, which is not limited herein.

Furthermore, when the gestures are inputted at the third instruction input area 30C, the display image of the electronic device corresponding to the input device 1 slides accordingly. For example, if the gesture is a finger that continuously slides along the periphery (clockwise or counterclockwise), the display image is scrolled upward or downward according to the speed of the sliding.

If the input device 1 is in the second control mode (the touchpad mode), further gesture combinations can be recognized except simple gestures utilized in the mouse mode. For example, when two fingers rotate leftward or rightward at the touchpad 30, which means the two detecting points are detected simultaneously, and the two detecting points moves in an arc simultaneously in the same direction, the images or the pictures on the display image can be rotated, or the images or the pictures on the display image can be zoomed in or zoomed out by a gesture of separating or pinching fingers.

Additionally, in the embodiment, the touchpad includes a user interface, and the user interface may be a virtual keyboard, function keys or shortcut keys, and the positions of the virtual keys can be defined by the user. The user interface can cooperate with the second control mode, especially cooperate with the remote control mode, which is not limited herein.

In an embodiment, the state detecting module of the input device 1 further includes a third state detecting unit (not shown) disposed at the main body 10. The third state detecting unit may be an accelerometer, a gyroscope, a magnetometer, which is not limited herein.

Moreover, the third state detecting unit can cooperate with the remote control mode of the second control mode. The third state detecting unit generates a third detecting signal (an indirect signal) to the control unit for the subsequent remote control.

In an embodiment, a fourth state detecting unit 203 also can be disposed at the bottom surface 102 of the main body 10. The fourth state detecting unit is used to assist to determine whether to switch to the remote control mode. Similarly, the fourth state detecting unit 203 is a capacitive sensor, a temperature sensor, an infrared sensor, a proximity sensor and a camera unit, or combinations above, which is not limited herein.

If the state detecting units are capacitive sensors, the first detecting signal generated from the first state detecting unit 201 is a capacitance signal, and the capacitance is 0 (the input device may be disposed at the hand of the user), the second detecting signal generated from the second state detecting units 202a and 202b is a capacitance signal, and the capacitance is 0, a fourth detecting signal detected by the fourth state detecting unit 203 is a positive value (the user at least grasp the position where the fourth state detecting unit 203 is disposed at). In that case, it can determine that the input device 1 is used as a remote control device. Therefore, the input device 1 is switched to the second control mode (the remote control mode).

In brief, the position where the fourth state detecting unit 203 is disposed at is the grasped position when the input device 1 is used as the remote control device, and thus the gesture of the user can be determined via the fourth detecting signal generated from the fourth state detecting unit 203, so as to switch to the remote control mode.

The remote control mode is that the input device 1 is moved in the three-dimensional space to control the corresponding electronic device.

In the embodiment, an electronic device may cooperate with at least the input device 1. The electronic device may be a desktop computer, a notebook computer, a TV game, a display screen, a smartphone, which is not limited herein.

Figure 6:
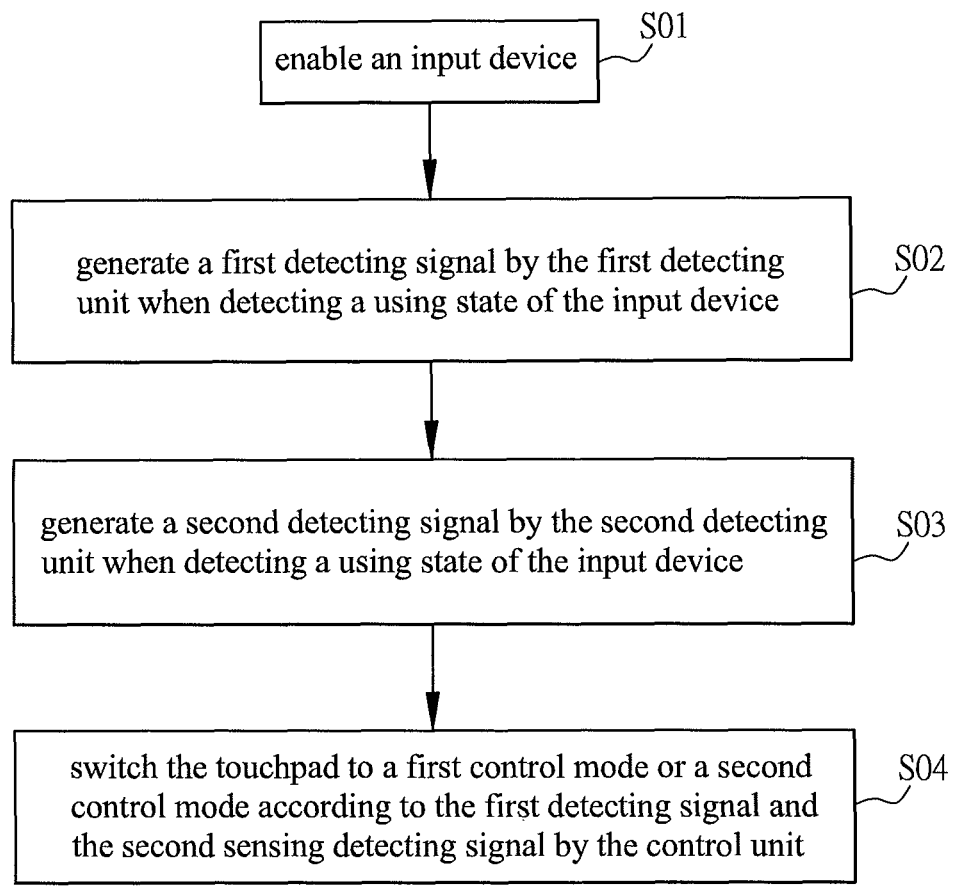
FIG. 6 is a flowchart showing a method of input mode switching.

Pleases refer to FIG. 6, a method of switching an input mode is provided. The steps can cooperate with the input device 1, which is not limited herein.

The method includes: enabling the input device 1 (step S01); generating a first detecting signal after the first state detecting unit detects a using state of the input device (step S02); generating a second detecting signal after the second state detecting unit detects the using state of the input device (step S03); switching the touchpad to a first control mode or a second control mode by a control unit according to the first detecting signal and the second detecting signal (step S04).

In brief, the gestures at the input device can be determined via the detecting signals detected by the state detecting units at the different positions, and the control mode of the touchpad is switched according to the different scenarios.

Additionally, the method may further include: inputting gestures at the third instruction input area; and controlling an image displayed on an electronic device corresponding to the input device to slide accordingly. The operating modes and the gestures of the third instruction input area are similar to those in the above embodiment, which are omitted herein.

In conclusion, by coupling the main body (the mouse) and the touchpad, and the state detecting module can determine different using states and different operating scenarios, consequently, different input modes can be integrated to the input device without changing the use experience of the traditional mouse and the touchpad. Thus, a more convenient input device is provided.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. An input device, comprising:
   a main body including a top surface, a bottom surface and a side surface connected the bottom surface and the top surface;
   a state detecting module including a first state detecting unit and a second state detecting unit, the first state detecting unit is disposed at the bottom surface, the second state detecting unit is disposed at the side surface, and the first state detecting unit and the second state detecting unit detect a using state of the input device, and the first state detecting unit generates a first detecting signal and the second state detecting unit generates a second detecting signal;
   a touchpad disposed at the top surface; and
   a control unit electrically connected to the state detecting module and the touchpad;
   wherein the control unit switches the touchpad to a first control mode or a second control mode according to the first detecting signal and the second detecting signal.

2. The input device according to claim 1, wherein the first control mode is a mouse mode.

3. The input device according to claim 1, wherein the second control mode is a touchpad mode, a remote control mode or the combination thereof.

4. The input device according to claim 2, wherein when the input device is in the first control mode, the touchpad includes a first instruction input area and a second instruction input area.

5. The input device according to claim 1, wherein the state detecting module further includes a third state detecting unit disposed at the main body.

6. The input device according to claim 5, wherein the third state detecting unit is an accelerometer, a gyroscope or a magnetometer.

7. The input device according to claim 1, wherein the first state detecting unit and the second state detecting unit are a capacitive sensor, a temperature sensor, an infrared sensor, a proximity sensor and a camera unit or combinations thereof.

8. The input device according to claim 3, wherein when the input device is in the second control mode, the touchpad further includes a third instruction input area, and the third instruction input area is disposed at the periphery of the touchpad.

9. The input device according to claim 8, wherein when a gesture is inputted on the third instruction input area, an image of an electronic device corresponding to the input device slides accordingly.

10. The input device according to claim 1, wherein the touchpad further includes a user interface.

11. A method of switching an input mode, applied to an input device, the input device includes a main body, a state detecting module and a touchpad, and the main body includes a top surface, a bottom surface and a side surface connected the bottom surface and the top surface, and the state detecting module includes a first state detecting unit and a second state detecting unit, the first state detecting unit is disposed at the bottom surface, the second state detecting unit is disposed at the side surface, the touchpad is disposed at the top surface, wherein the method comprises:

detecting a using state of the input device by the first state detecting unit and the second state detecting unit;

generating a first detecting signal from the first state detecting unit;

generating a second detecting signal from the second state detecting unit; and switching the touchpad to a first control mode or a second control mode according to the first detecting signal and the second detecting signal.

12. The method according to claim 11, wherein the first control mode is a mouse mode.

13. The method according to claim 11, wherein the second control mode is a touchpad mode, a remote control mode or a combination thereof.

14. The method according to claim 12, wherein when the input device is in the first control mode, the touchpad includes a first instruction input area and a second instruction input area.

15. The method according to claim 11, wherein the state detecting module further includes a third state detecting unit disposed at the main body.

16. The method according to claim 15, wherein the third state detecting unit is an accelerometer, a gyroscope or a magnetometer.

17. The method according to claim 11, wherein the first state detecting unit and the second state detecting unit are a capacitive sensor, a temperature sensor, an infrared sensor, a proximity sensor, a camera unit, or combinations thereof.

18. The method according to claim 13, wherein when the input device is in the second control mode, the touchpad further includes a third instruction input area, and the third instruction input area is disposed at the periphery of the touchpad, and the method further comprises:

inputting a gesture at the third instruction input area; and controlling an image of an electronic device corresponding to the input device to slide accordingly.

19. The method according to claim 11, wherein the touchpad further includes a user interface.

\* \* \* \* \*